US011640010B2

(12) United States Patent
Cruse et al.

(10) Patent No.: US 11,640,010 B2
(45) Date of Patent: May 2, 2023

(54) FOREIGN BODY DETECTION IN A COMBINATION WEIGHER

(71) Applicant: CLK GMBH, Altenberge (DE)

(72) Inventors: Carsten Cruse, Dülmen (DE); Christian Dabringhaus, Münster (DE); Hendrik Haase, Warendorf (DE); Sebastian Belz, Münster (DE); Matthias Biefang, Münster (DE)

(73) Assignee: CLK GmbH, Altenberge (DE)

( * ) Notice: Subject to any disclaimer, the term of this patent is extended or adjusted under 35 U.S.C. 154(b) by 470 days.

(21) Appl. No.: 16/759,122

(22) PCT Filed: Oct. 22, 2018

(86) PCT No.: PCT/DE2018/100862
§ 371 (c)(1),
(2) Date: Apr. 24, 2020

(87) PCT Pub. No.: WO2019/080966
PCT Pub. Date: May 2, 2019

(65) Prior Publication Data
US 2020/0341166 A1   Oct. 29, 2020

(30) Foreign Application Priority Data

Oct. 24, 2017 (DE) .................... 10 2017 124 895.1

(51) Int. Cl.
*G01V 8/10* (2006.01)
*B65B 1/32* (2006.01)
(Continued)

(52) U.S. Cl.
CPC .................. *G01V 8/10* (2013.01); *B65B 1/32* (2013.01); *B65B 57/16* (2013.01); *B65B 57/18* (2013.01);
(Continued)

(58) Field of Classification Search
CPC ...... G06N 3/08; A22C 18/00; A22C 17/0093; B65B 1/32; B65B 57/16; B65B 57/18;
(Continued)

(56) References Cited

U.S. PATENT DOCUMENTS 9,234,787 B2 *  1/2016  Nagai .................. G01G 19/393
2012/0207272 A1 *  8/2012  Runft ..................... B65B 3/003
378/57
(Continued)

FOREIGN PATENT DOCUMENTS

CN      206330663 U  *  7/2017  ............. G01G 19/00
DE      3701335 A1      7/1988
(Continued)

OTHER PUBLICATIONS

International Search Report for PCT/DE2018/100862 dated Feb. 15, 2019 [PCT/ISA/210].
(Continued)

*Primary Examiner* — Masum Billah
(74) *Attorney, Agent, or Firm* — Sughrue Mion, PLLC

(57) ABSTRACT

An assembly for detection of foreign bodies in a multihead weigher includes an image recorder and a lighting module and an image evaluation module. The multihead weigher includes weighing containers for filling with bulk material, a selection of the bulk material being emptiable into chutes combined in the shape of a funnel upon arrival of a trigger signal. The image recorder records an image series, and the lighting module and the image evaluation module output a
(Continued)

signal upon detection of a foreign body in the image series. The image recorder includes one or more cameras for optical capturing of the funnel, the one or more cameras being arranged inside of or above the funnel and being set up to capture one or more sections of an interior surface of the funnel between two horizontal planes.

20 Claims, 2 Drawing Sheets

(51) Int. Cl.
    *B65B 57/18*     (2006.01)
    *G01G 19/393*     (2006.01)
    *G01N 21/85*     (2006.01)
    *B65B 57/16*     (2006.01)

(52) U.S. Cl.
    CPC .......... *G01G 19/393* (2013.01); *G01N 21/85* (2013.01); *G01N 2021/8592* (2013.01)

(58) Field of Classification Search
    CPC .......... B65B 25/04; B65B 1/34; B65B 35/32; B65B 35/40; B65B 35/46; B65B 1/28; B65B 51/046; B65B 1/22; B65B 39/004; B65B 1/06; B65B 39/003; B65B 61/188
    USPC ....................................................... 356/237
    See application file for complete search history.

(56) References Cited

U.S. PATENT DOCUMENTS

| 2014/0238754 | A1* | 8/2014 | Liao | G01G 19/42 |
| --- | --- | --- | --- | --- |
| | | | | 177/1 |
| 2015/0021103 | A1* | 1/2015 | Tamai | G01G 19/387 |
| | | | | 177/25.18 |
| 2015/0226600 | A1* | 8/2015 | Kikuchi | G01G 19/393 |
| | | | | 177/25.18 |

FOREIGN PATENT DOCUMENTS

| DE | 102005052769 A1 | 5/2007 | |
| --- | --- | --- | --- |
| DE | 10 2011 075 607 A1 | 11/2012 | |
| DE | 102011075607 A1 | 11/2012 | |
| EP | 2 634 546 A1 | 9/2013 | |
| EP | 2 827 114 A1 | 1/2015 | |
| WO | 2006/129391 A1 | 12/2006 | |
| WO | WO-2006129391 A1 * | 12/2006 | ........... B07C 5/3422 |
| WO | 2018/024096 A1 | 2/2018 | |

OTHER PUBLICATIONS

Written Opinion for PCT/DE2018/100862 dated Feb. 15, 2019 [PCT/ISA/237].
International Preliminary Report on Patentability with Translation of Written Opinion of the International Searching Authority for PCT/DE2018/100862 dated Apr. 28, 2020.

* cited by examiner

FOREIGN BODY DETECTION IN A COMBINATION WEIGHER

CROSS REFERENCE TO RELATED APPLICATIONS

This application is a National Stage of International Application No. PCT/DE2018/100862 filed Oct. 22, 2018, claiming priority based on German Patent Application No. 10 2017 124 895.1 filed Oct. 22, 2018, the entire contents of each of which are herein incorporated by reference in their entireties.

BACKGROUND

1. Field

The invention relates to a device for detection of foreign bodies in a multihead weigher and also to an apparatus for detection of foreign bodies for a multihead weigher.

2. Description of Related Art

Multihead weighers or partial quantity weighers are known from the prior art for fast filling of bulk material in predetermined quantities or quantity ratios. Specifically, in the foodstuffs industry they are often used for filling of foodstuffs into cans, jars, bags or similar packaging containers.

In a generic embodiment, such as that described for example in EP 2 634 546 A1, a multihead weigher features a plurality of weighing containers arranged in a circular shape above a funnel, which are filled with the infilling bulk material. The mass of the bulk material located therein is detected in the weighing container and then due to the evaluation logic, those weighing containers are identified whose total content, for example, comes closest to the predetermined total quantity. These weighing containers are emptied into the funnel located underneath for filling of the packaging container.

Due to hygienic requirements, multihead weighers of this kind are usually of a compact and enclosed design.

SUMMARY

The object of the present invention is to specify an improved multihead weigher.

The solution to this problem according to the invention is provided by the features of the independent claims. Advantageous embodiments of the invention are specified in the dependent claims.

According to the invention, a device is provided for detection of foreign bodies in a multihead weigher, wherein the multihead weigher features a plurality of weighing containers for filling with bulk material; upon arrival of a trigger signal the weighing containers can be selected for emptying into one or into a plurality of chutes combined in the form of a funnel, wherein the device features an image recording unit for recording of an image series, a lighting unit and an image evaluation unit for output of a signal upon detection of a foreign body in an image series, wherein the image recording unit features at least one camera for optical detection of the funnel, wherein the at least one camera is arranged inside of or above the funnel and is set up to detect at least one section of the interior surface of the funnel between two horizontal planes.

The image recording unit herein can also advantageously feature a plurality of cameras which are arranged cross-wise or in a ring shape inside of or above the funnel, wherein the cameras are set up so that each one optically detects an interior section of the funnel, wherein the optically detectable sections adjoin each other horizontally such that the interior surface of the funnel is nearly completely detected by the cameras at least between two horizontal planes. The at least one camera, or the plurality of cameras of the image recording unit can be set up for detecting of at least one spectral range of specific wavelength each, in order to differentiate different constituents of the bulk material, in particular of foreign bodies contained in the bulk material, based on different reflection properties of the surface and/or the material. Thus for example, synthetic materials are detectable preferably in the near infrared range.

With this kind of device the obtained advantage is that for a required examination of the bulk material before filling into a compact, enclosed packaging apparatus, the examination need not be subjected to a separate analysis for detection of foreign bodies, but rather that the foreign body detection can be integrated into a multihead weigher as part of a packaging apparatus. The detection of the foreign bodies can proceed advantageously in the weighed bulk material to be filled. When using a plurality of cameras the advantage obtained is that due to the image recording unit with equivalent camera resolution, a higher-resolution and less distorted image series can be obtained. Advantageously the image recording unit and/or the lighting unit are arranged inside of the multihead weigher between the weighing containers or underneath the weighing containers. In this manner and for hygienic reasons, an enclosed system can be achieved. During the filling process in which the bulk material slides along chutes combined in the form of a funnel, a stream of a bulk material forms.

In other words, a device is provided for recognition of foreign bodies in the stream of bulk material in a multihead weigher, with a plurality of weighing containers for filling of bulk material, wherein upon arrival of a trigger signal the weighing containers can be selected for emptying into one or into a plurality of chutes combined in the form of a funnel, a lighting unit is arranged inside of the multihead weigher between the weighing containers or underneath the weighing containers, an image recording unit for recording of an image series with at least one camera which is arranged inside of or above the funnel and is set up to detect the bulk material in a section of the interior surface of the funnel between two horizontal planes, and an image evaluation unit to output a signal upon the detection of a foreign body in the recorded image series.

In this regard the invention makes use of the circumstance that the bulk material during the filling process, in which the bulk material slides along chutes combined in the form of a funnel, is spread out and distributed along the chute after a short drop from the weighing container. Advantageously the spreading is supported during the sliding process on the chute by a knob-like design of the surface of the chute. Due to a plurality of cameras the bulk material is fully detectable in the funnel, in that the cameras fully detect a predetermined height section inside of the funnel. Thus, a foreign body inside the bulk material can be detected as it passes through this height section inside of the funnel. An interior height section of the funnel can be detected in sections by several cameras, in that the individual cameras detect horizontally and mutually adjoining sections between two horizontal planes of the funnel. In this regard the cameras are arranged cross-wise, or have the shape corresponding to that of the funnel and being arranged inside of or above, for example, along the edge of the funnel, wherein the funnel can be designed as a triangle, square or polygon.

It is also advantageous to design the lighting unit as flat, in particular in the shape of a lighting disk. Advantageously this lighting disk emits a diffuse light or a light generated by a plurality of illuminants. This provides the advantage that it can be easily integrated into the multihead weigher, and secondly also the advantage that reflections caused by the shaking are reduced. Advantageously the lighting disk can feature a plurality of LEDs, which are arranged in a disk-shaped housing protected against water spray and disposed behind a common, transparent pane.

The lighting unit and/or the image recording unit can be advantageously triggered by the trigger signal for recording of an image series. Triggering of the lighting unit and/or of the image recording unit can be delayed by a predetermined time that correlates with the drop height of the bulk material. Thus the efficiency of the image evaluation unit can be increased, since the image recording can be restricted to a short period of time and the image evaluation can be limited to those images produced during one passage of the bulk material through the detected height section within the funnel.

Advantageously the image series comprises a recording of at least 6 images in 300 ms.

Advantageously the bulk material on the chutes can be detected by the at least one camera at a predetermined angle, in particular between 50 and 90 degrees. A detection angle of this kind can be 60 degrees, for example.

Advantageously also the interior surface of the funnel detectable by the at least one camera is located between the horizontal planes approximately at a medium height of the funnel. At a medium height of the funnel the bulk material has the greatest spreading for detection of its individual constituents, after it has previously left the weighing dish in a piled-up shape and before it is again combined due to the shape of the funnel.

In addition, it is also advantageous to set up and configure the image evaluation unit so that it will recognize a foreign body or can distinguish a foreign body from the bulk material and generate a detection signal. For detection of the foreign bodies, known evaluation methods from the prior art can be used, wherein the foreign body can be identifiable according to shape and color. The function of the device can be verifiable by means of a test method in which, for example, a defined foreign body can be placed into the section of the funnel detectable by the camera. The detection signal can be fed back to the multihead weigher, for example to stop a filling process, to generate a warning signal, to tag the packing container or to identify the packing container.

According to the invention a foreign body detection apparatus is provided for a multihead weigher for filling of bulk material, upon arrival of a trigger signal the weighing containers can be selected for emptying into one or into a plurality of chutes combined in the form of a funnel, characterized in that the foreign body detection apparatus is designed for integration into a multihead weigher and the foreign body detection apparatus features a camera which is set up to detect at least one section of the interior surface of the funnel between two horizontal planes.

In one advantageous embodiment, the foreign body detection apparatus features a plurality of cameras which are arranged or set up so that each one optically detects an interior section of the funnel, wherein the optically detectable sections adjoin each other horizontally such that the interior surface of the funnel is nearly completely detected by the cameras at least between two horizontal planes.

A foreign body detection apparatus of this kind can be advantageously retrofitted into an existing multihead weigher and integrated therein, for example, to obtain the device for detection of foreign bodies in a multihead weigher described above.

Advantageously the foreign body detection apparatus can feature means to support the integration, for example, in the form of affixing means.

Additional advantageous embodiments and installation information on the foreign body detection apparatus are found in the device described above for detection of foreign bodies in a multihead weigher.

BRIEF DESCRIPTION OF THE DRAWINGS

The invention will be explained in greater detail below with reference to the accompanying schematic drawings which relate to one preferred embodiment.

The figures show.

DETAILED DESCRIPTION

Figure 1:
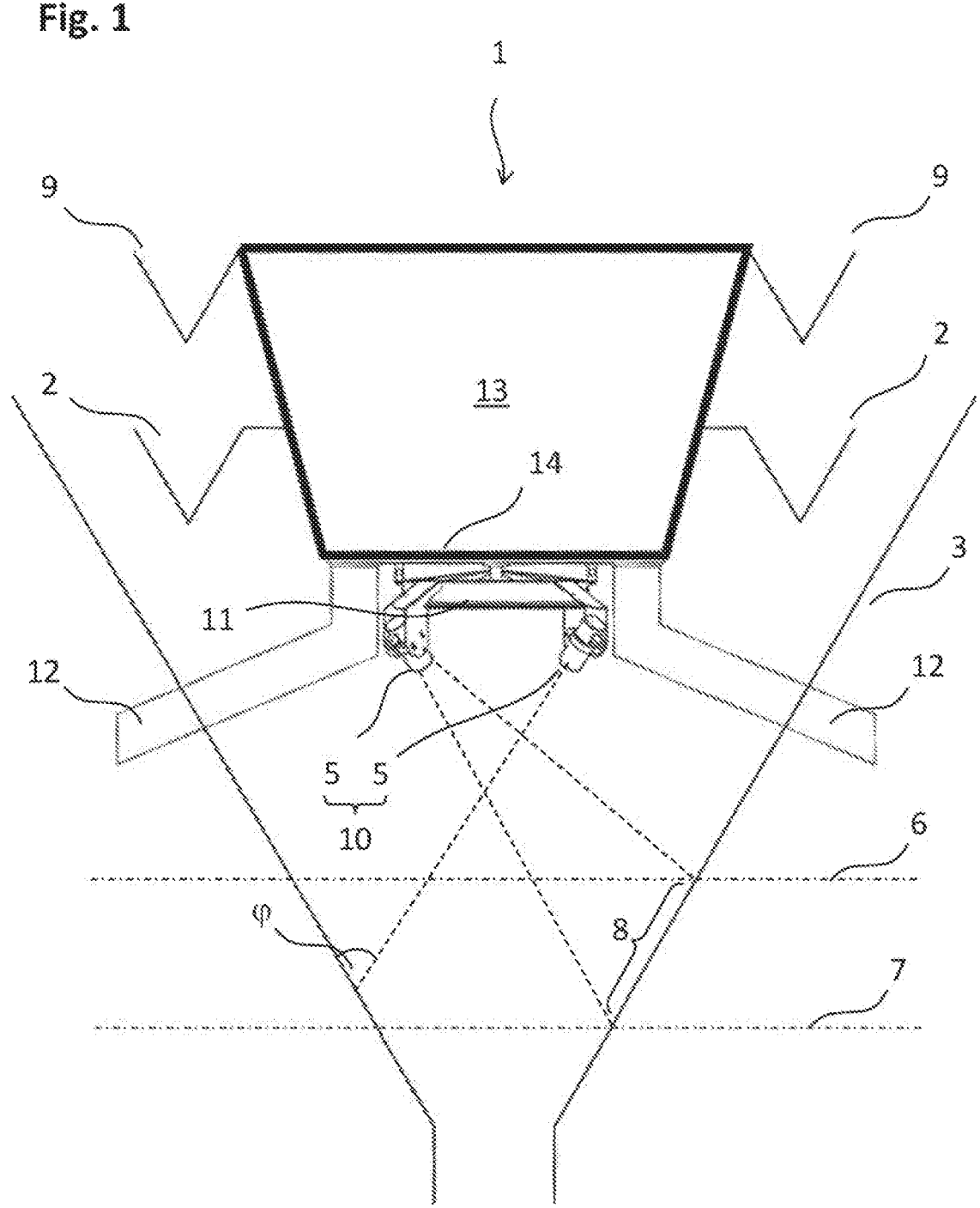
FIG. 1 A schematic depiction of a device for detection of foreign bodies in a multihead weigher.

FIG. 1 presents a schematic depiction of a device for detection of foreign bodies in a multihead weigher 1.

FIG. 1 depicts a device for detection of foreign bodies in a multihead weigher 1, wherein the multihead weigher 1 features a plurality of weighing containers 2 for weighing and filling of bulk material. Upon output of a trigger signal, some of them can be synchronously emptied into one or more chutes combined in the shape of a funnel 3. The device features an image recording unit 10 for recording of an image series, a lighting unit 11 and an image evaluation unit for output of a signal upon detection of a foreign body in an image series, wherein the image recording unit 10 features a plurality of cameras 5. The cameras 5 are arranged cross-wise or in a ring shape inside of or above the funnel 3 and are set up so that each one optically detects an interior section 8 of the funnel 3. The sections 8 optically detectable by each of the cameras 5 adjoin each other horizontally in such a manner that the interior surface of the funnel 3 is almost completely detected by the cameras 5, at least between two horizontal planes 6, 7.

The detectable section 8 is located at a middle height of the funnel 5. In an expedient embodiment, the multihead weigher 1 features supply containers 9 located above the weighing containers 3 for faster filling of the weighing containers 3. Additional elements of the multihead weigher 1 have not been depicted herein for the sake of conciseness.

FIG. 1 also depicts the image recording unit 10 and the lighting unit 11 arranged inside of the multihead weigher 1 centrally underneath the weighing containers 3. In this case the lighting unit 11 is designed in the form of a lighting disk. The lighting disk has the shape of a short cylinder made of stainless steel which is sealed on its one end with a stainless steel base and on its other end with a transparent pane. The cylinder is protected against the penetration of water spray by means of a rubber ring provided between the pane and the stainless steel wall. Behind the pane are illuminants (not illustrated), for example, in the form of LEDs. The cameras 5 of the image recording unit 10 are arranged such that the bulk material on the chutes or in the funnel 3 can be detected at an angle φ of about 60 degrees.

The image recording unit 10 and also the lighting unit 11 are mounted centrally under the base 14 of an interior housing 13 of the multihead weigher 1. The interior housing 13 of the multihead weigher 1 is supported by short tubes 12 which extend between the chutes forming the funnel 3.

Figure 2:
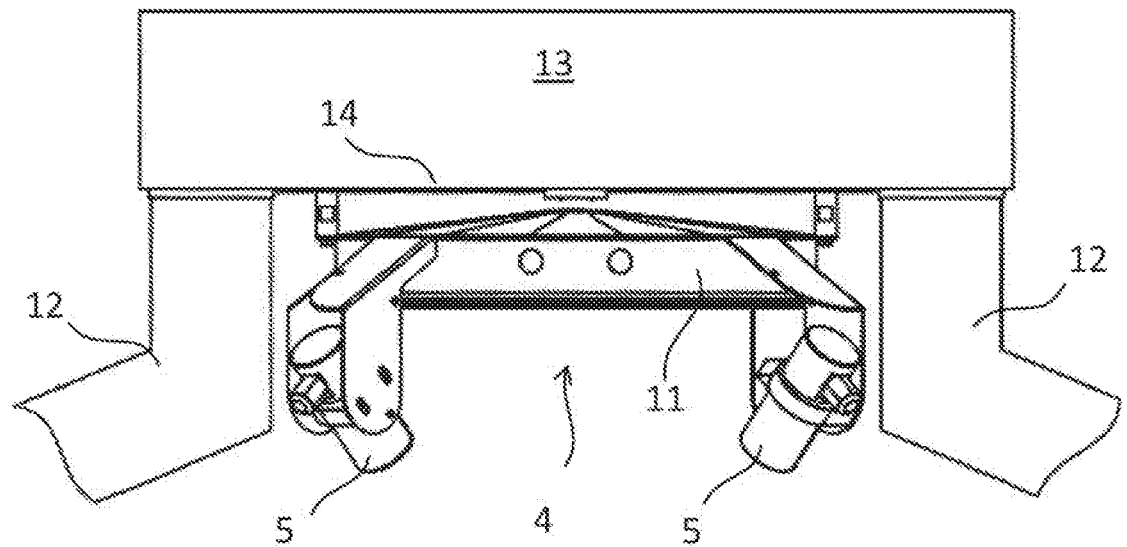
FIG. 2 A side view of a foreign body detection apparatus in a multihead weigher

FIG. 2 presents a side view of a foreign body detection apparatus 4 in a multihead weigher 1. FIG. 2 presents the foreign body detection apparatus 4 in detail, comprising the image recording unit 10 with cameras 5 and also the lighting unit 11. The foreign body detection apparatus 4 is installed underneath an interior housing base 14 of a multihead weigher 1. The interior housing 13 of the multihead weigher 1 is supported by the short tubes 12.

Figure 3:
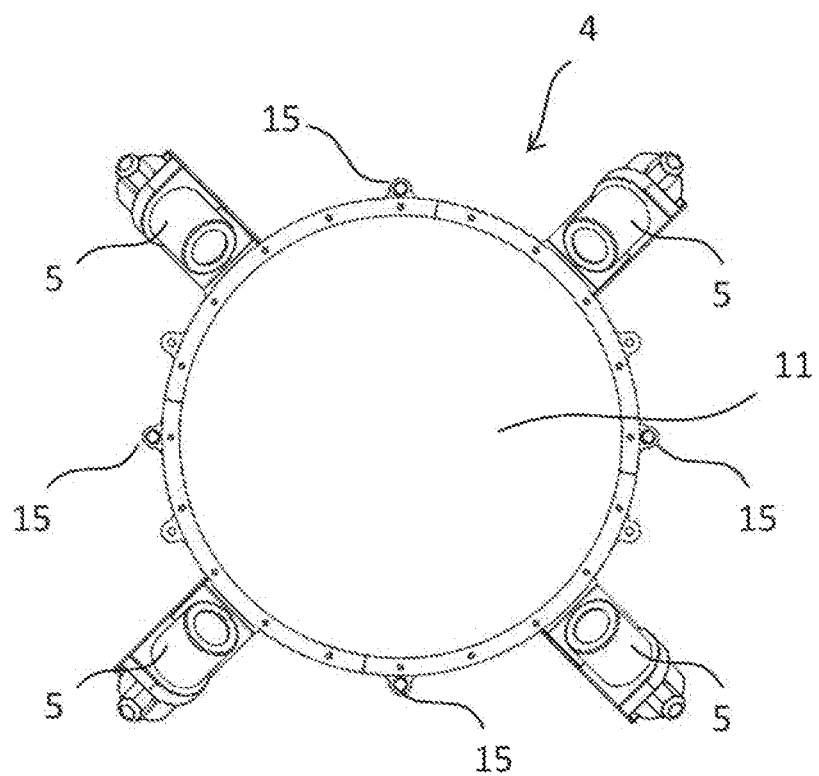
FIG. 3 A foreign body detection apparatus in a multihead weigher as seen from below.

FIG. 3 depicts a foreign body detection apparatus 4 in a multihead weigher 1 in a view from below, with a view of the nozzle of the funnel 3. FIG. 3 shows that the foreign body detection apparatus 4 features affixing means 15 for affixing of the foreign body detection apparatus 4 underneath the housing base 14 of the multihead weigher 1.

The invention claimed is:

1. An assembly for detection of foreign bodies in a multihead weigher, wherein the multihead weigher comprises a plurality of weighing containers for filling with bulk material, wherein a selection of the bulk material are emptiable into a plurality of chutes combined in the shape of a funnel upon arrival of a trigger signal, the assembly comprising:
   an image recording unit that records an image series; and
   a lighting unit and an image evaluation unit that output a signal upon detection of a foreign body in an image series,
   wherein the image recording unit comprises at least one camera for optical capturing of the funnel, the at least one camera being arranged inside of or above the funnel and is set up to capture at least one section of an interior surface of the funnel between two horizontal planes.

2. The assembly according to claim 1, wherein the multihead weigher comprises a plurality of cameras which are arranged cross-wise or in a ring shape inside of or above the funnel, wherein the plurality of cameras of the multihead weigher are set up so that each one optically captures an interior section of the funnel, and
   wherein the optically capturable sections adjoin each other horizontally such that the interior surface of the funnel is nearly completely captured by the plurality of the cameras of the multihead weigher at least between two horizontal planes.

3. The assembly according to claim 1, wherein the image recording unit and/or the lighting unit are arranged inside of the multihead weigher between the weighing containers or underneath the weighing containers.

4. The assembly according to claim 1, wherein the lighting unit is of a flat design.

5. The assembly according to claim 1, wherein the lighting unit is in the form of a lighting disk.

6. The assembly according to claim 1, wherein the lighting unit and/or the image recording unit are configured to be triggered by the trigger signal for recording of the image series.

7. The assembly according to claim 1, wherein the trigger signal triggers the lighting unit and/or the image recording unit, and the trigger signal is delayed by a predetermined time that correlates with a drop height of the bulk material.

8. The assembly according to claim 6, wherein the image series comprises a recording of at least 6 images in 300 ms.

9. The assembly according to claim 1, wherein the bulk material on the chutes is captured by the at least one camera at an angle φ of about 60 degrees.

10. The assembly according to claim 1, wherein the interior surface of the funnel capturable by the at least one camera is located between the two horizontal planes at a medium height of the funnel.

11. A foreign body detection apparatus for a multihead weigher with a plurality of weighing containers for filling with bulk material, wherein upon arrival of a trigger signal the plurality of weighing containers are emptied into one chute or into a plurality of chutes combined in the shape of a funnel, wherein the foreign body detection apparatus is integrated into a multihead weigher, and the foreign body apparatus comprises at least one camera which is set up to capture at least one section of an interior surface of the funnel between two horizontal planes.

12. A multihead weigher comprising:
   a funnel;
   a plurality of weighing containers for filling with bulk material, the bulk material in one or more of the plurality of weighing containers configured to be emptied into the funnel based on a first trigger signal;
   at least one camera arranged to capture an image series of at least one interior section of the funnel that is between two horizontal planes; and
   a light arranged to light the at least one interior section of the funnel; and
   evaluation logic that outputs a signal upon detection of a foreign body in the image series.

13. The multihead weigher according to claim 12, wherein the at least one camera comprises a plurality of cameras arranged cross-wise or in a ring shape inside of or above the funnel, the plurality of cameras configured to optically capture respective portions of the interior section of the funnel, and
   wherein the respective portions of the interior section of the funnel adjoin each other horizontally.

14. The multihead weigher according to claim 12, wherein the light and/or the evaluation logic is arranged inside of the multihead weigher between the plurality of weighing containers or underneath the plurality of weighing containers.

15. The multihead weigher according to claim 12, wherein the light comprises a light disk.

16. The multihead weigher according to claim 12, wherein the light comprises a plurality of light emitting diodes.

17. The multihead weigher according to claim 12, wherein the light and/or the evaluation logic is triggered by a second trigger signal.

18. The multihead weigher according to claim 17, wherein the second trigger signal is delayed by a reference time from the first trigger signal.

19. The multihead weigher according to claim 17, wherein the reference time is correlated to a drop height of the bulk material.

20. The multihead weigher according to claim 12, wherein the image series comprises at least 6 images over 300 ms.

* * * * *